United States Patent
He (10) Patent No.: US 10,554,907 B2
(45) Date of Patent: Feb. 4, 2020

(54) IMPROVING STATIC IMAGE QUALITY WHEN OVERLAYING A DYNAMIC IMAGE AND STATIC IMAGE

(71) Applicant: Huawei Technologies Co., Ltd., Shenzhen (CN)

(72) Inventor: Liping He, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 15/555,400

(22) PCT Filed: Mar. 2, 2015

(86) PCT No.: PCT/CN2015/073515
§ 371 (c)(1),
(2) Date: Sep. 1, 2017

(87) PCT Pub. No.: WO2016/138621
PCT Pub. Date: Sep. 9, 2016

(65) Prior Publication Data
US 2018/0070022 A1    Mar. 8, 2018

(51) Int. Cl.
*H04N 5/265* (2006.01)
*G09G 5/397* (2006.01)
(Continued)

(52) U.S. Cl.
CPC .............. *H04N 5/265* (2013.01); *G09G 5/397* (2013.01); *H04N 21/431* (2013.01); *H04N 21/44004* (2013.01); *G06T 13/00* (2013.01); *G06T 13/80* (2013.01); *G09G 2340/10* (2013.01); *G09G 2340/12* (2013.01)

(58) Field of Classification Search
CPC ..... G06T 13/00; G06T 13/80; G09G 2340/10; G09G 2340/12; G09G 5/395
See application file for complete search history.

(56) References Cited

U.S. PATENT DOCUMENTS

2002/0171765 A1   11/2002  Waki et al.
2007/0168878 A1*   7/2007  Berstis .................. G06F 3/0481
                                                            715/790
(Continued)

FOREIGN PATENT DOCUMENTS

CN          1365571 A      8/2002
CN          1696979 A     11/2005
(Continued)

*Primary Examiner* — Michelle L Sams
(74) *Attorney, Agent, or Firm* — Leydig, Voit & Mayer, Ltd.

(57) ABSTRACT

Embodiments of the present invention relate to the data processing field, and disclose an image processing method and apparatus, and an electronic terminal, to improve image quality of a static image after the static image and a dynamic image are overlaid. According to the embodiments of the present invention, the method includes: receiving an image overlay instruction; obtaining a static image, a dynamic image, a data length of the dynamic image, and a coordinate position of the dynamic image in the static image; and generating, according to the image overlay instruction, target image data including the static image and the dynamic image. The present invention is applicable to an image processing procedure.

12 Claims, 8 Drawing Sheets

(51) Int. Cl.
*H04N 21/431* (2011.01)
*H04N 21/44* (2011.01)
*G06T 13/80* (2011.01)
*G06T 13/00* (2011.01)

(56) References Cited

U.S. PATENT DOCUMENTS

2007/0279410 A1   12/2007   Xiong
2008/0291218 A1   11/2008   Sheng et al.
2014/0078398 A1   3/2014   Shenoy et al.

FOREIGN PATENT DOCUMENTS

| | | |
|---|---|---|
| CN | 1997106 A | 7/2007 |
| CN | 101005609 A | 7/2007 |
| CN | 101893725 A | 11/2010 |
| CN | 102547198 A | 7/2012 |
| CN | 102566796 A | 7/2012 |
| CN | 202652420 U | 1/2013 |
| CN | 103442181 A | 12/2013 |
| CN | 103714565 A | 4/2014 |
| EP | 2711929 A1 | 3/2014 |
| JP | 2009130496 A * | 6/2009 |
| WO | 2014049398 A1 | 4/2014 |

* cited by examiner

IMPROVING STATIC IMAGE QUALITY WHEN OVERLAYING A DYNAMIC IMAGE AND STATIC IMAGE

CROSS-REFERENCE TO RELATED APPLICATIONS

This application is a National Stage of International Application No. PCT/CN2015/073515, filed on Mar. 2, 2015, which is hereby incorporated by reference in its entirety.

TECHNICAL FIELD

The present invention relates to the data processing field, and in particular, to an image processing method and apparatus, and an electronic terminal.

BACKGROUND

As users impose increasingly high requirements on images, electronic terminals provide many new functions for the users to meet user demands. For example, a user can overlay multiple photos. The user may overlay a static image and another static image, or may overlay a dynamic image and a static image, so that an effect that the user is satisfied with is achieved by overlaying different images. Currently, if a user wants to overlay a dynamic image and a static image, the user needs to preprocess the static image before overlaying the images. However, a process of preprocessing a static image generally may reduce image quality of the static image. For example, a dynamic Graphics Interchange Format (GIF) image is generated by overlaying a static image and a dynamic image, where the GIF image is in 8-bit color, but the static image is generally in true color. During overlay, the true color static image needs to be converted into an 8-bit color image. Colors included in the 8-bit color image are less than colors included in the true color image. Consequently, image quality of the converted static image is inevitably reduced, and an effect that the user is satisfied with cannot be achieved.

SUMMARY

Embodiments of the present invention provide an image processing method and apparatus, and an electronic terminal, to improve image quality of a static image after the static image and a dynamic image are overlaid.

To achieve the foregoing objective, the embodiments of the present invention use the following technical solutions.

According to a first aspect, an embodiment of the present invention provides an image processing method, including:

obtaining a static image;

obtaining a dynamic image, a data length of the dynamic image, and a coordinate position of the dynamic image in the static image;

obtaining an image overlay instruction, where the image overlay instruction is used to instruct to overlay the dynamic image and the static image; and generating, according to the image overlay instruction, target image data including the static image and the dynamic image, where the target image data includes an area indicating the static image, an area indicating the data length of the dynamic image, an area indicating the position of the dynamic image, and an area indicating the dynamic image.

With reference to the first aspect, in a first possible implementation manner of the first aspect, the obtaining a dynamic image includes:

obtaining, according to an obtaining instruction entered by a user, ambient data by using a sensor on an electronic terminal; and generating the dynamic image according to the ambient data.

With reference to the first possible implementation manner of the first aspect, in a second possible implementation manner, when the dynamic image is generated, the method includes:

decoding the target image data according to a received decoding instruction to generate a target image.

With reference to the second possible implementation manner of the first aspect, in a third possible implementation manner, the method includes:

determining coordinates of the dynamic image in the static image according to a drag instruction entered by a user.

According to a second aspect, an embodiment of the present invention provides an image processing apparatus, including:

a first obtaining unit, configured to obtain a static image;

a second obtaining unit, configured to obtain a dynamic image, a data length of the dynamic image, and a coordinate position of the dynamic image in the static image;

an instruction receiving unit, configured to receive an image overlay instruction, where the image overlay instruction is used to instruct to overlay the dynamic image and the static image; and a generation unit, configured to generate, according to the image overlay instruction, target image data including the static image and the dynamic image, where the target image data includes an area indicating the static image, an area indicating the data length of the dynamic image, an area indicating the position of the dynamic image, and an area indicating the dynamic image.

With reference to the second aspect, in a first possible implementation manner of the second aspect, the second obtaining unit includes:

an obtaining subunit, configured to obtain, according to an obtaining instruction entered by a user, ambient data by using a sensor on an electronic terminal; and a generation subunit, configured to generate the dynamic image according to the ambient data.

With reference to the first possible implementation manner of the second aspect, in a second possible implementation manner, the generation unit further includes:

a decoding subunit, configured to decode the target image data according to a received decoding instruction to generate a target image.

With reference to the second possible implementation manner of the second aspect, in a third possible implementation manner, the apparatus includes:

a determining unit, configured to determine coordinates of the dynamic image in the static image according to a drag instruction entered by a user.

According to a third aspect, an embodiment of the present invention provides an electronic terminal, including:

a memory, configured to store information including a program instruction, and store a static image, a dynamic image, and a target image that are obtained; and a processor, coupled to the memory, configured to control execution of the program instruction, and specifically configured to: obtain the static image; obtain the dynamic image, a data length of the dynamic image, and a coordinate position of the dynamic image in the static image; receive an image overlay instruction, where the image overlay instruction is used to instruct to overlay the dynamic image and the static image; and generate, according to the image overlay instruction, target image data including the static image and the dynamic image, where the target image data includes an area indicating the static image, an area indicating the data length of the dynamic image, an area indicating the position of the dynamic image, and an area indicating the dynamic image.

With reference to the third aspect, in a first possible implementation manner of the third aspect, the processor is further configured to obtain, according to an obtaining instruction entered by a user, ambient data by using a sensor on the electronic terminal; and the processor is further configured to generate the dynamic image according to the ambient data.

With reference to the first possible implementation manner of the third aspect, in a second possible implementation manner, the processor is further configured to decode the target image data according to a received decoding instruction, to output a target image.

With reference to the second possible implementation manner of the third aspect, in a third possible implementation manner, the processor is further configured to determine coordinates of the dynamic image in the static image according to a drag instruction entered by a user.

According to the image processing method and apparatus, and the electronic terminal provided in the embodiments of the present invention, an image overlay instruction is received, and a static image, a dynamic image, a data length of the dynamic image, and a coordinate position of the dynamic image in the static image are obtained, and then target image data including the static image and the dynamic image is generated according to the image overlay instruction, so as to overlay the static image and the dynamic image. Compared with the prior art in which in a process of overlaying a static image and a dynamic image, the static image first needs to be converted to a format that is the same as that of the dynamic image before overlay, resulting in a problem that image quality of the static image reduces, in the present invention, an extension field of the static image is set to avoid a format conversion process of the static image when the static image and the dynamic image are overlaid, so as to ensure that the image quality of the static image is not damaged when the static image and the dynamic image are overlaid.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
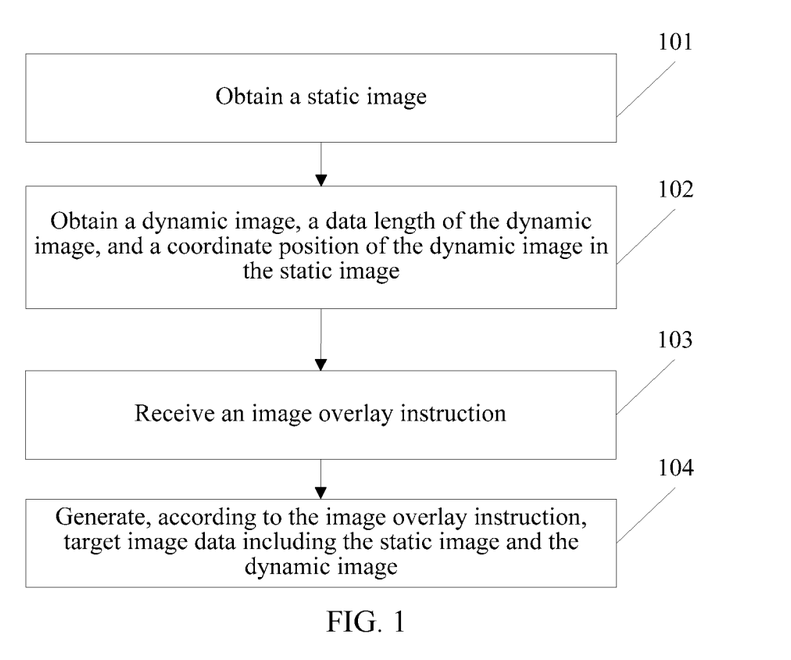
FIG. 1 is a flowchart of an image processing method according to an embodiment of the present invention.

An embodiment of the present invention provides an image processing method, to improve image quality of a static image after the static image and a dynamic image are combined. A procedure of the image processing method is shown in FIG. 1, including:

101: Obtain the static image.

The static image may be an image stored in an electronic terminal, or may be an image that is being obtained by using an image-taking application.

102: Obtain the dynamic image, a data length of the dynamic image, and a coordinate position of the dynamic image in the static image.

The dynamic image may be a waveform graph, a spectrum graph, or a volume graph. A format of the dynamic image may be GIF, or may be another dynamic image format. The format of the dynamic image is not limited in the present invention. It should be noted that, a sequence of obtaining an image overlay instruction and obtaining a static image and a dynamic image may be flexible. For example, the image overlay instruction is obtained first, and the dynamic and static images are obtained subsequently. For example, a user chooses to generate an overlaid image by operating a menu, and then separately obtains or takes a dynamic image and a static image. Alternatively, a static image and/or a dynamic image may be obtained first, and the image overlay instruction is obtained subsequently. For example, the user selects a static image and a dynamic image first and edits the static image and the dynamic image. Alternatively, the user takes a new image or selects an existing image such as the static image first, selects overlay editing, and then selects or takes a dynamic image for overlaying, that is, overlays the dynamic image on the static image. Alternatively, a dynamic image may be selected first, overlay editing is selected, and then a static image is obtained, to overlay the dynamic image on the static image.

103: Receive an image overlay instruction.

The image overlay instruction is used to instruct to overlay the dynamic image and the static image.

104: Generate, according to the image overlay instruction, target image data including the static image and the dynamic image.

The target image data includes an area indicating the static image, an area indicating the data length of the dynamic image, an area indicating the position of the dynamic image, and an area indicating the dynamic image.

It should be noted that, an original field used for displaying the static image may be a field that meets any one of existing static image storage formats such as a JPEG (Joint Photographic Experts Group, Joint Photographic Experts Group) format, PNG (Portable Network Graphic, portable network graphic) format, and a TIFF (Tagged Image File, tagged image file) format. Setting an extension field of the static image is specifically adding the extension field behind the static image storage format. Addition of the extension field affects neither a process of reading the static image by the electronic terminal, nor the image quality of the static image. In addition, the extension field added behind the static image storage format includes: a field indicating the length of the dynamic image, a field indicating coordinates of the dynamic image in the static image, and a field indicating data of the dynamic image.

It is noteworthy that the present invention provides a user-defined image storage format. The user-defined image storage format includes two types of image data, that is, one type is static image, and the other type is dynamic image. To facilitate understanding this embodiment of the present invention, an example is given for description. An example is as follows:

|0xffd8 . . . 0xffd9| 0x6C65 0x6E67 0x7468 0x7548|0xff78 0x0245 0xff79 0x0154| 0x4749 0x4638 0x3961 . . . |.

The foregoing character segments are storage forms of a target image. oxffd8 to 0xffd9 are the area indicating the static image; 0x6C65 to 0x7548 are the area indicating the length of the dynamic image; 0xff78 to 0x0154 indicate coordinates of the dynamic image area in the whole static image area; and 0x4749 to the end are the dynamic image. It should be noted that, the area storing the static image is a fixed area, and the static image needs to be decoded preferentially when decoding is performed. A sequence of the following other three types of storage contents is not limited, but the area indicating the length of the dynamic image needs to be placed before the area storing the dynamic image. In this way, when the target image is read, the area indicating the length of the dynamic image is always read first, and then the area storing the dynamic image is read, so that the electronic terminal conveniently decodes the target image.

According to the image processing method provided in this embodiment of the present invention, an image overlay instruction is received, a static image, a dynamic image, a data length of the dynamic image, and a coordinate position of the dynamic image in the static image are obtained, and then target image data including the static image and the dynamic image is generated according to the image overlay instruction. Compared with the prior art in which in a process of overlaying a static image and a dynamic image, the static image first needs to be converted to a format that is the same as that of the dynamic image before overlay, resulting in a problem that image quality of the static image reduces, in the present invention, an extension field of the static image is set to avoid a format conversion process of the static image when the static image and the dynamic image are overlaid, so as to ensure that the image quality of the static image is not damaged when the static image and the dynamic image are overlaid.

Figure 3:
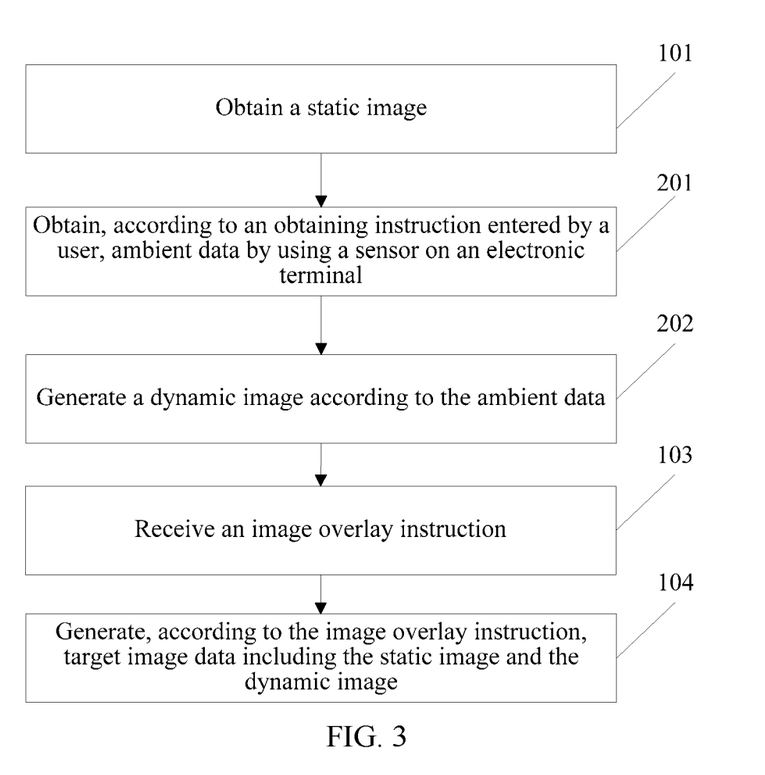
FIG. 3 is a flowchart of another image processing method according to an embodiment of the present invention.

In another embodiment of the present invention, as shown in FIG. 3, a procedure of a method for obtaining a dynamic image in step 102 is described in detail, including:

201: Obtain, according to an obtaining instruction entered by a user, ambient data by using a sensor on an electronic terminal.

The obtaining instruction entered by a user includes a category of to-be-obtained dynamic data that is selected by the user. For example, if the obtaining instruction entered by a user is obtaining audio type data, ambient audio data may be obtained by using a microphone. Similarly, if the obtaining instruction entered by a user is obtaining ambient temperature data, a current ambient temperature is obtained by using a thermometer. In conclusion, the user may select different sensors on the electronic terminal to obtain corresponding ambient data. A sensor is configured to detect a physical quantity of an electronic device. For example, a force, a torque, a pressure, a stress, a position, a displacement, a speed, an acceleration, an angle, an angular speed, a quantity of rotation times, a rotational speed, a time point at which an operating status changes, and the like are converted into quantitative electricity form for detection and control. Some other sensing devices may further include a gravity sensor, a tri-axis accelerometer, a gyroscope, and the like.

202: Generate the dynamic image according to the ambient data.

Different ambient data is represented by using a dynamic image corresponding to the ambient data. For example, if audio data is obtained, it is more intuitive to use a volume graph to represent the audio data. However, if heartbeat data is obtained, it is more intuitive to use an electrocardiogram to represent the data. In conclusion, the generated dynamic image needs to intuitively represent the obtained ambient data.

In another embodiment of the present invention, step 104 is described in detail, including:

decoding target image data according to a received decoding instruction to generate a target image.

Figure 2:
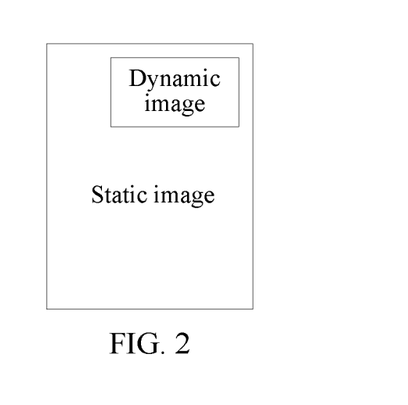
FIG. 2 is a schematic diagram of a target image obtained after a static image and a dynamic image are overlaid.

When a user views the target image, the target image data only needs to be decompressed and display, and a step of decompression and display is implemented by programming by using a computer language. In the step of decompression and display, a software program written by using any computer language can be used to perform decompression, decoding, and display on the target image data. An electronic terminal first obtains static image data of the target image data, and parses the static image data, to generate the static image. Next, the electronic terminal reads the subsequent target image data except the static image data, and obtains coordinates of dynamic image data in the static image, a size of the dynamic image, and the dynamic image data. After the dynamic image data is obtained, the dynamic image data is decoded, to generate the dynamic image. A display position of the dynamic image in the static image is determined according to coordinates of the dynamic image. Referring to FIG. 2, FIG. 2 shows the target image including the static image and the dynamic image.

Figure 4:
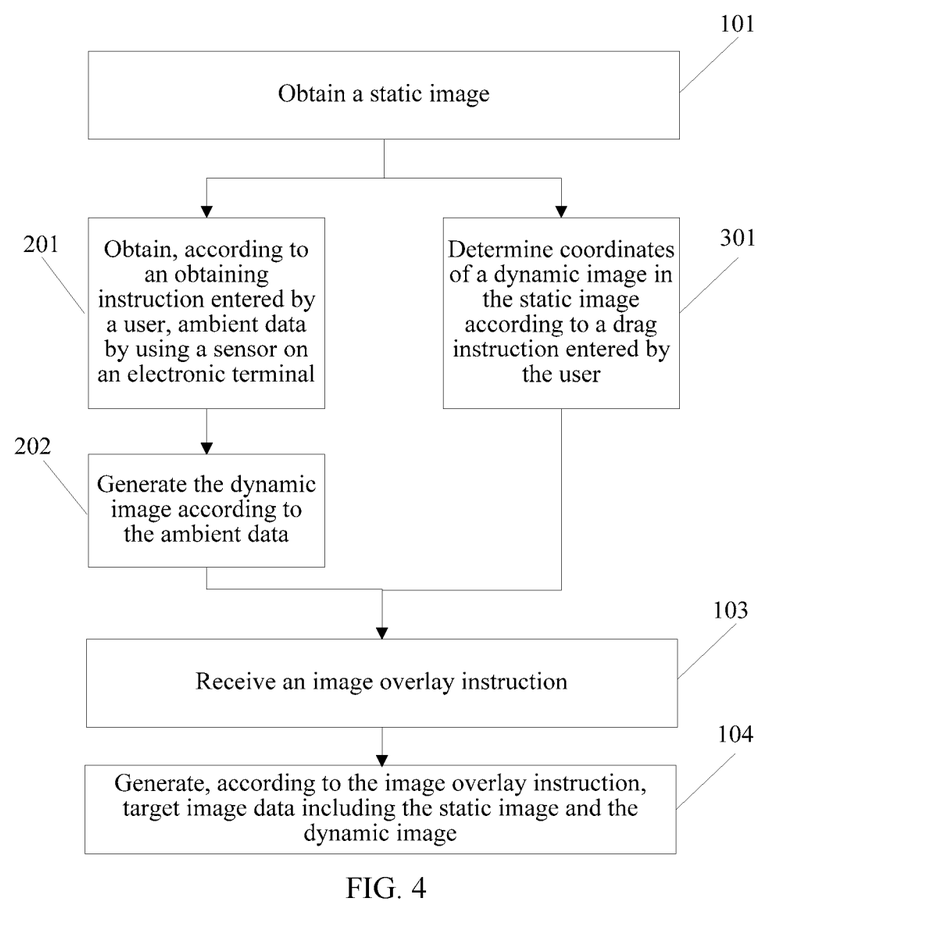
FIG. 4 is a flowchart of another image processing method according to an embodiment of the present invention.

In another embodiment of the present invention, a procedure of a method for obtaining coordinates of a dynamic image in a static image is described. As shown in FIG. 4, the procedure includes:

301: Determine the coordinates of the dynamic image in the static image according to a drag instruction entered by a user.

Because contents of obtained static images are different from each other, a position in which the dynamic image is overlaid cannot be fixed. Therefore, the dynamic image needs to be moved according to the drag instruction entered by the user. For example, when the user performs a move operation on a screen of an electronic terminal by using any proper object or attachment such as a finger or a stylus, the electronic terminal detects the touch operation by the user, converts the detected touch operation into an electrical signal, converts the electrical signal into coordinates of a touch point, and corresponds the coordinates of the touch point with coordinates in the static image according to a position of the coordinates of the touch point in the static image. In this way, the coordinate position of the dynamic image in the static image is determined.

According to the image processing method provided in this embodiment of the present invention, an image overlay instruction is received, a static image, a dynamic image, a data length of the dynamic image, and a coordinate position of the dynamic image in the static image are obtained, and then target image data including the static image and the dynamic image is generated according to the image overlay instruction. Compared with the prior art in which in a process of overlaying a static image and a dynamic image, the static image first needs to be converted to a format that is the same as that of the dynamic image before overlay, resulting in a problem that image quality of the static image reduces, in the present invention, an extension field of the static image is set to avoid a format conversion process of the static image when the static image and the dynamic image are overlaid, so as to ensure that the image quality of the static image is not damaged when the static image and the dynamic image are overlaid.

Figure 5:
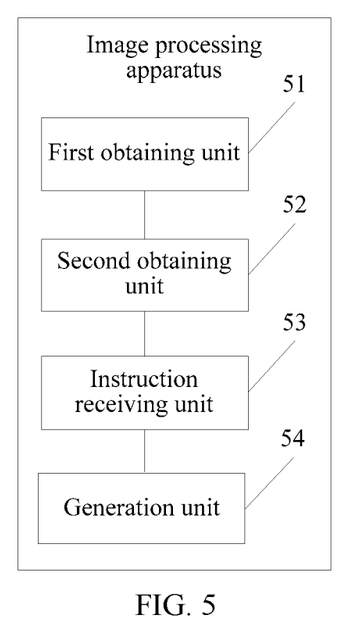
FIG. 5 is a composition block diagram of an image processing apparatus according to an embodiment of the present invention.

The present invention further provides an image processing apparatus. As shown in FIG. 5, the image processing apparatus includes: a first obtaining unit 51, a second obtaining unit 52, an instruction receiving unit 53, and a generation unit 54.

The first obtaining unit 51 is configured to obtain a static image.

The second obtaining unit 52 is configured to obtain a dynamic image, a data length of the dynamic image, and a coordinate position of the dynamic image in the static image.

The instruction receiving unit 53 is configured to receive an image overlay instruction, where the image overlay instruction is used to instruct to overlay the dynamic image and the static image.

The generation unit 54 is configured to generate, according to the image overlay instruction, target image data including the static image and the dynamic image.

The target image data includes an area indicating the static image, an area indicating the data length of the dynamic image, an area indicating the position of the dynamic image, and an area indicating the dynamic image.

Figure 6:
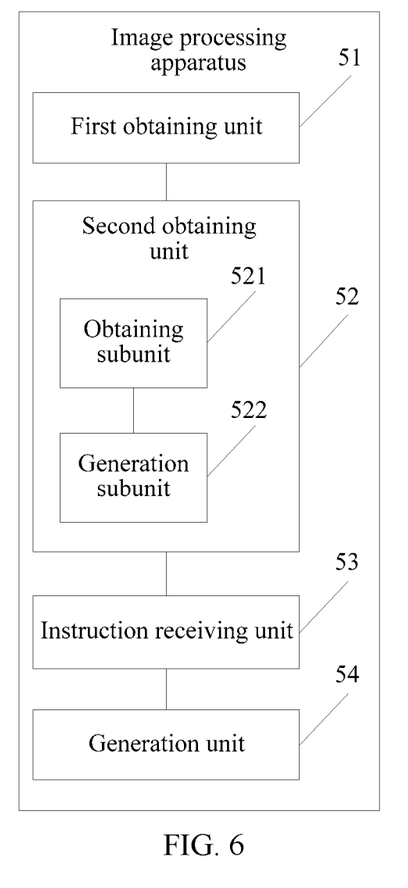
FIG. 6 is a composition block diagram of another image processing apparatus according to an embodiment of the present invention.

In another embodiment provided in the present invention, as shown in FIG. 6, the second obtaining unit 52 includes an obtaining subunit 521 and a generation subunit 522.

The obtaining subunit 521 is configured to obtain, according to an obtaining instruction entered by a user, ambient data by using a sensor on an electronic terminal.

The generation subunit 522 is configured to generate the dynamic image according to the ambient data.

Figure 7:
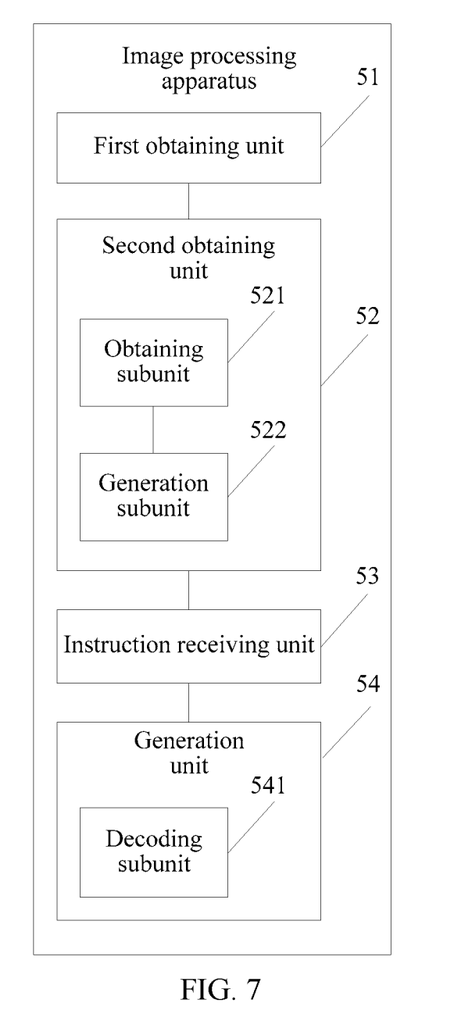
FIG. 7 is a composition block diagram of another image processing apparatus according to an embodiment of the present invention.

In another embodiment provided in the present invention, as shown in FIG. 7, the generation unit 54 further includes a decoding subunit 541.

The decoding subunit 541 is further configured to generate a target image by decoding the target image data according to a received decoding instruction.

Figure 8:
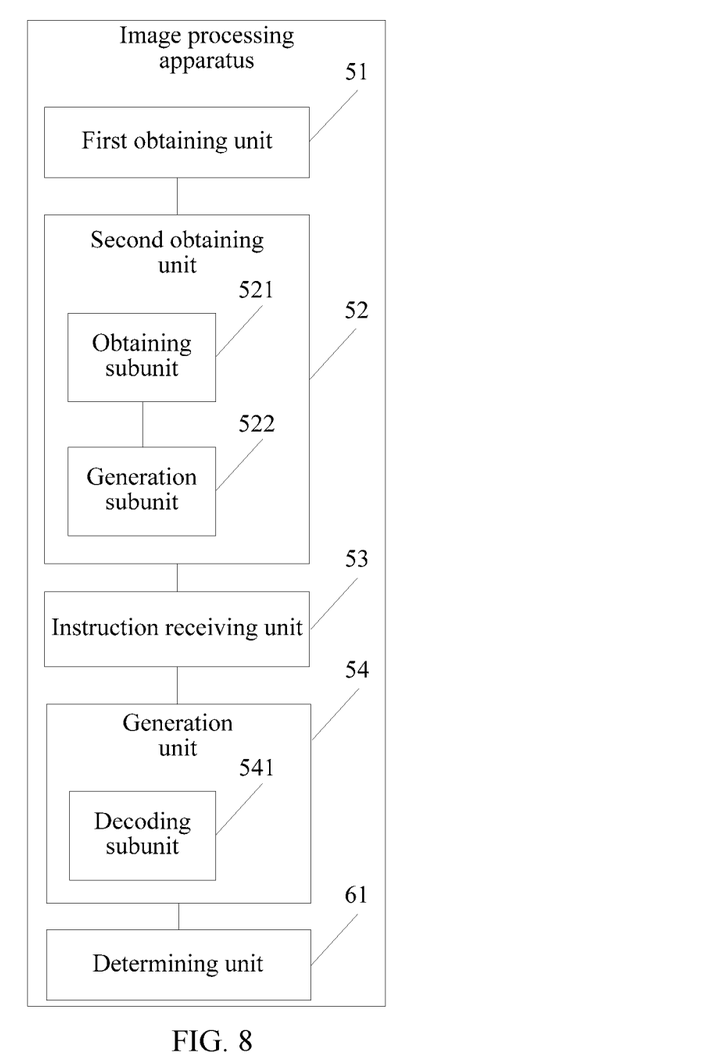
FIG. 8 is a composition block diagram of another image processing apparatus according to an embodiment of the present invention.

In another embodiment provided in the present invention, as shown in FIG. 8, the apparatus includes a determining unit 61.

The determining unit 61 is configured to determine coordinates of the dynamic image in the static image according to a drag instruction entered by a user.

According to the image processing apparatus provided in this embodiment of the present invention, an image overlay instruction is received, a static image, a dynamic image, a data length of the dynamic image, and a coordinate position of the dynamic image in the static image are obtained, and then target image data including the static image and the dynamic image is generated according to the image overlay instruction. Compared with the prior art in which in a process of overlaying a static image and a dynamic image, the static image first needs to be converted to a format that is the same as that of the dynamic image before overlay, resulting in a problem that image quality of the static image reduces, in the present invention, an extension field of the static image is set to avoid a format conversion process of the static image when the static image and the dynamic image are overlaid, so as to ensure that the image quality of the static image is not damaged when the static image and the dynamic image are overlaid.

It is noteworthy that the apparatus shown in FIG. 5 to FIG. 8 is configured to implement the procedures of the method shown in FIG. 1, FIG. 3, and FIG. 4.

Figure 9:
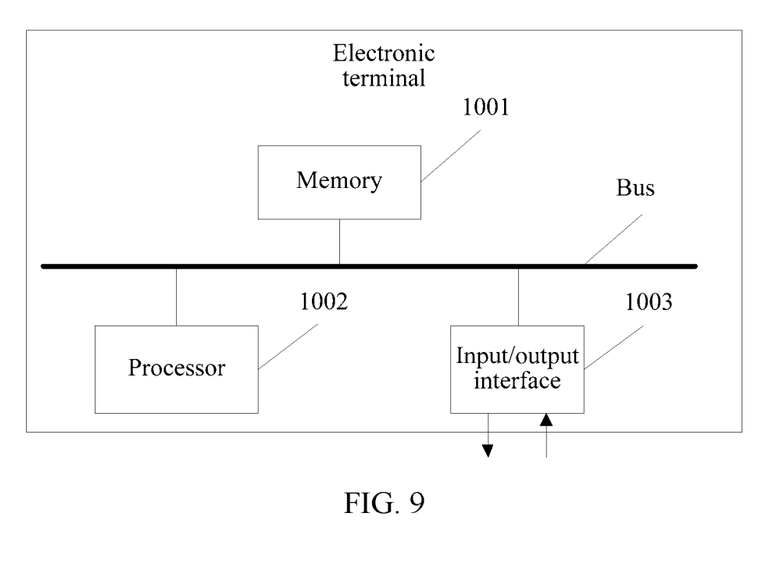
FIG. 9 is a composition block diagram of an electronic terminal according to an embodiment of the present invention.

The present invention further provides an electronic terminal. As shown in FIG. 9, the electronic terminal includes: a memory 1001, a processor 1002, and an input/output interface 1003. The memory 1001, the processor 1002, and the input/output interface 1003 are connected by using a bus, and may perform data transmission between each other.

The memory 1001 is configured to store information including a program instruction, and store a static image, a dynamic image, and a target image that are obtained.

The processor 1002 is coupled to the memory, configured to control execution of the program instruction, and specifically configured to: obtain the static image; obtain the dynamic image, a data length of the dynamic image, and a coordinate position of the dynamic image in the static image; receive an image overlay instruction, where the image overlay instruction is used to instruct to overlay the dynamic image and the static image; and generate, according to the image overlay instruction, target image data including the static image and the dynamic image, where the target image data includes an area indicating the static image, an area indicating the data length of the dynamic image, an area indicating the position of the dynamic image, and an area indicating the dynamic image.

The input/output interface 1003 is configured to output the target image according to the target image data.

In an optional composition manner of the electronic terminal provided in this embodiment, the processor 1001 is further configured to obtain, according to an obtaining instruction entered by a user, ambient data by using a sensor on the electronic terminal.

The processor 1001 is further configured to generate the dynamic image according to the ambient data.

In an optional composition manner of the electronic terminal provided in this embodiment, the processor 1001 is further configured to generate the target image by decoding target image data according to a received decoding instruction.

In an optional composition manner of the electronic terminal provided in this embodiment, the processor 1001 is further configured to determine coordinates of the dynamic image in the static image according to a drag instruction entered by a user.

According to the electronic terminal provided in this embodiment of the present invention, an image overlay instruction is received, a static image, a dynamic image, a data length of the dynamic image, and a coordinate position of the dynamic image in the static image are obtained, and then target image data including the static image and the dynamic image is generated according to the image overlay instruction. Compared with the prior art in which in a process of overlaying a static image and a dynamic image, the static image first needs to be converted to a format that is the same as that of the dynamic image before overlay, resulting in a problem that image quality of the static image reduces, in the present invention, an extension field of the static image is set to avoid a format conversion process of the static image when the static image and the dynamic image are overlaid, so as to ensure that the image quality of the static image is not damaged when the static image and the dynamic image are overlaid.

It is noteworthy that the electronic terminal shown in FIG. 9 is configured to implement the procedures of the method shown in FIG. 1, FIG. 3, and FIG. 4.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image processing method, carried out by an electronic terminal, for generating a target image data comprising both a data of a static image and a data of a dynamic image, the method comprising:
   obtaining the data of a static image;
   obtaining the data of a dynamic image;
   obtaining a data length of the dynamic image and a coordinate position of the dynamic image in the static image; and
   obtaining an image overlay instruction that instructs the electronic terminal to overlay the dynamic image and the static image, and
   generating, according to the image overlay instruction, the target image data comprising a plurality of separate fields such that the target image data comprises:
      a static image field indicating the data of the static image, and
      at least one separate further field, separate from the static image field, wherein the at least one separate further field indicates:
         the data length of the dynamic image,
         a position of the dynamic image, and
         the data of the dynamic image.

2. The method according to claim 1, wherein the obtaining the data of the dynamic image comprises:
   obtaining, according to an obtaining instruction entered by a user, an ambient data by using a sensor on the electronic terminal; and
   generating the data of the dynamic image according to the ambient data.

3. The method according to claim 1, further comprising:
   decoding the target image data according to a received decoding instruction to generate a target image.

4. The method according to claim 3, wherein the obtaining the coordinate position of the dynamic image in the static image comprises:
   determining coordinates of the dynamic image in the static image according to a drag instruction entered by a user.

5. An electronic terminal, comprising:
   a memory, configured to store information comprising a program instruction, and store a static image, a dynamic image, and a target image; and
   a processor, coupled to the memory, configured to execute the program instruction to carry out a method for generating a target image data comprising both a data of a static image and a data of a dynamic image, the method comprising:
      obtaining the data of a static image;
      obtaining the data of a dynamic image;
      obtaining a data length of the dynamic image and a coordinate position of the dynamic image in the static image; and
      obtaining an image overlay instruction that instructs the electronic terminal to overlay the dynamic image and the static image, and
      generating, according to the image overlay instruction, the target image data comprising a plurality of separate fields such that the target image data comprises:
         a static image field indicating the data of the static image, and
         at least one separate further field, separate from the static image field, wherein the at least one separate further field indicates:
            the data length of the dynamic image,
            a position of the dynamic image, and
            the data of the dynamic image.

6. The electronic terminal according to claim 5, wherein the processor is further configured to obtain, according to an obtaining instruction entered by a user, an ambient data using a sensor on the electronic terminal; and
   the processor is further configured to generate the data of the dynamic image according to the ambient data.

7. The electronic terminal according to claim 5, wherein the processor is further configured to decode the target image data according to a received decoding instruction to generate the target image.

8. The electronic terminal according to claim 7, wherein the processor is further configured to determine coordinates of the dynamic image in the static image according to a drag instruction entered by a user.

9. A non-transitory computer-readable storage medium, comprising instructions which, when executed by a computer, cause the computer to implement a method for generating a target image data comprising both a data of a static image and a data of a dynamic image, the method comprising:
    obtaining the data of a static image;
    obtaining the data of a dynamic image;
    obtaining a data length of the dynamic image and a coordinate position of the dynamic image in the static image; and
    obtaining an image overlay instruction that instructs the electronic terminal to overlay the dynamic image and the static image, and
    generating, according to the image overlay instruction, the target image data comprising a plurality of separate fields such that the target image data comprises:
        a static image field indicating the data of the static image, and
        at least one separate further field, separate from the static image field, wherein the at least one separate further field indicates:
            the data length of the dynamic image,
            a position of the dynamic image, and
            the data of the dynamic image.

10. The non-transitory computer-readable storage medium according to claim 9, wherein the obtaining the data of the dynamic image comprises:
    obtaining, according to an obtaining instruction entered by a user, an ambient data using a sensor on an electronic terminal; and
    generating the data of the dynamic image according to the ambient data.

11. The non-transitory computer-readable storage medium according to claim 9, the computer is further configured to:
    decode the target image data according to a received decoding instruction to generate a target image.

12. The non-transitory computer-readable storage medium according to claim 11, wherein when obtaining the coordinate position of the dynamic image in the static image, the computer is further configured to:
    determining coordinates of the dynamic image in the static image according to a drag instruction entered by a user.

* * * * *

UNITED STATES PATENT AND TRADEMARK OFFICE
CERTIFICATE OF CORRECTION

PATENT NO. : 10,554,907 B2
APPLICATION NO. : 15/555400
DATED : February 4, 2020
INVENTOR(S) : He

Page 1 of 1

It is certified that error appears in the above-identified patent and that said Letters Patent is hereby corrected as shown below:

In the Claims

Claim 2, Column 10, Line 15: "an ambient data by using a sensor" should read -- an ambient data using a sensor --.

Signed and Sealed this
Eighteenth Day of August, 2020

Andrei Iancu
*Director of the United States Patent and Trademark Office*